United States Patent
Murgu et al.

(10) Patent No.: US 7,036,746 B2
(45) Date of Patent: May 2, 2006

(54) POTABLE WATER HEATER AND METHOD OF USING SAME

(75) Inventors: Cristian Murgu, Coquitlam (CA); William John Haklander, Delta (CA); Edgar C. Robinson, Vancouver (CA)

(73) Assignee: International Thermal Investments Ltd., Richmond (CA)

( * ) Notice: Subject to any disclaimer, the term of this patent is extended or adjusted under 35 U.S.C. 154(b) by 15 days.

(21) Appl. No.: 09/907,467

(22) Filed: Jul. 16, 2001

(65) Prior Publication Data

US 2003/0010835 A1 Jan. 16, 2003

(51) Int. Cl.
B60H 1/02 (2006.01)

(52) U.S. Cl. .................. 237/12.3 B; 165/41; 165/42
(58) Field of Classification Search ............ 237/12.3 B, 237/2 A, 12.3 C, 12.3 R; 165/41, 42
See application file for complete search history.

(56) References Cited

U.S. PATENT DOCUMENTS

| 236,849 | A | * | 1/1881 | Searle ......................... 237/35 |
| 1,991,990 | A | | 2/1935 | VanVulpen et al. |
| 2,726,042 | A | * | 12/1955 | Baier et al. ............ 237/12.3 C |
| 3,877,639 | A | * | 4/1975 | Wilson et al. .......... 237/12.3 C |
| 4,010,895 | A | * | 3/1977 | Kofink et al. .......... 237/12.3 C |
| 4,232,211 | A | * | 11/1980 | Hill ............................. 219/202 |
| 4,280,330 | A | * | 7/1981 | Harris et al. ................. 62/3.3 |
| 4,391,104 | A | * | 7/1983 | Wendschlag ................... 62/79 |
| 4,591,691 | A | | 5/1986 | Badali |
| 4,860,951 | A | * | 8/1989 | Waas .......................... 237/2 A |
| 4,925,092 | A | * | 5/1990 | Yoshida et al. ........ 237/12.3 B |
| 5,025,985 | A | * | 6/1991 | Enander ..................... 237/2 A |
| 5,058,443 | A | | 10/1991 | Riedmaier |
| 5,067,652 | A | | 11/1991 | Enander |
| 5,211,333 | A | | 5/1993 | Schmalenbach et al. |
| 5,299,631 | A | * | 4/1994 | Dauvergne .................. 165/204 |
| 5,501,267 | A | * | 3/1996 | Iritani et al. ................ 165/202 |
| 6,332,580 | B1 | * | 12/2001 | Enander et al. ............. 237/2 A |

FOREIGN PATENT DOCUMENTS

| DE | 19805978 | 1/1999 |
| EP | 0 332 957 | 4/1989 |
| GB | 2240640 | 7/1991 |
| WO | WO99/61844 | 2/1999 |
| WO | WO 99/61844 | 12/1999 |

* cited by examiner

Primary Examiner—Derek S. Boles
(74) Attorney, Agent, or Firm—John Russell Uren

(57) ABSTRACT

A hot water heating system for use in a boat or vehicle which utilises the engine of the vehicle or boat, an AC power source or a fuel powered heater to heat a living area and to heat potable water. Each of the power sources can be utilised independently or in combination depending on the location and operation of the vehicle or boat. A valve is automatically controlled by a thermostat to allow heated fluid to circulate through the living area or to bypass the area. Aquastats are provided to automatically allow potable water to be heated. A display is provided for displaying textual and numerical information in user friendly format relating to the operation of the hot water heating system.

20 Claims, 15 Drawing Sheets

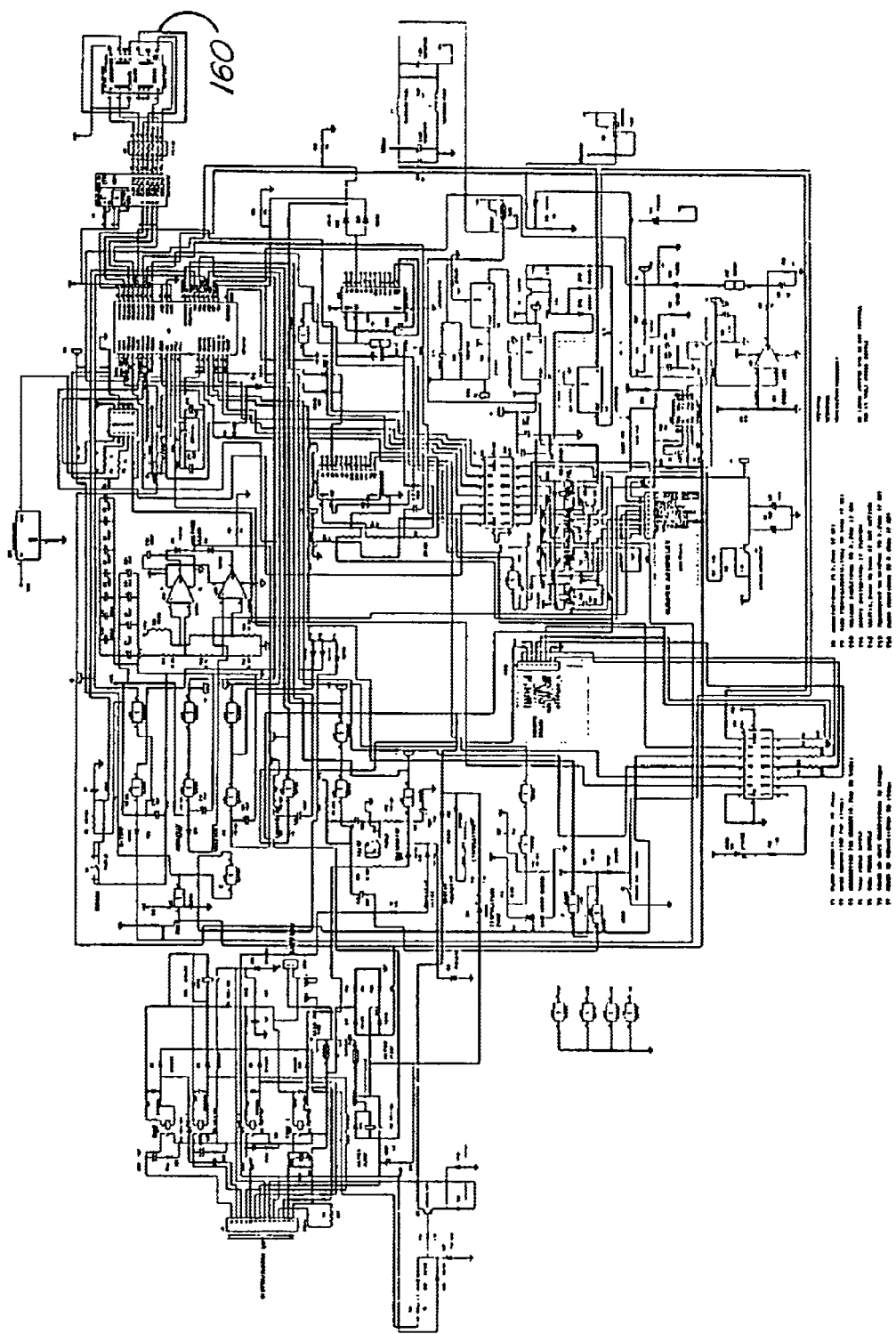
FIG. 5 (9 SHEETS)

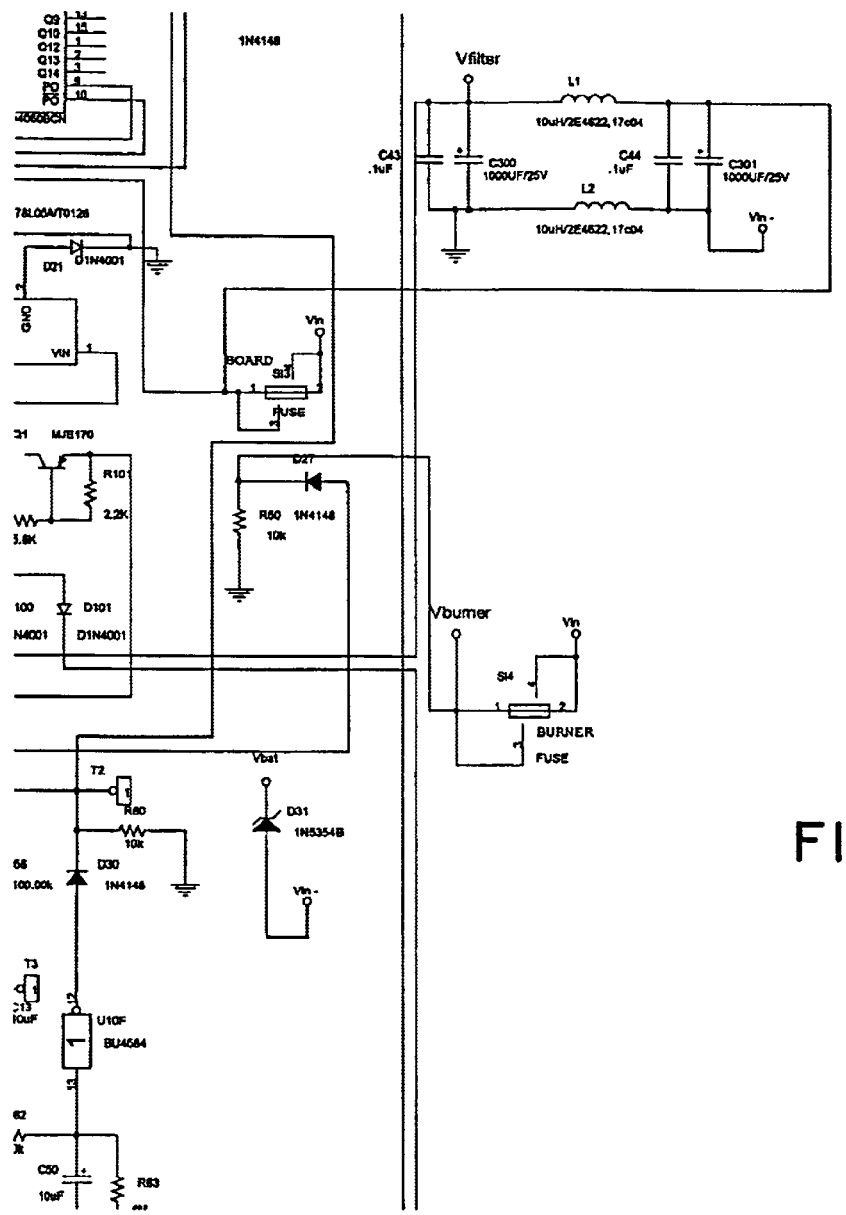
FIG. 5 (1/9)
FIG. 5 (2/9)

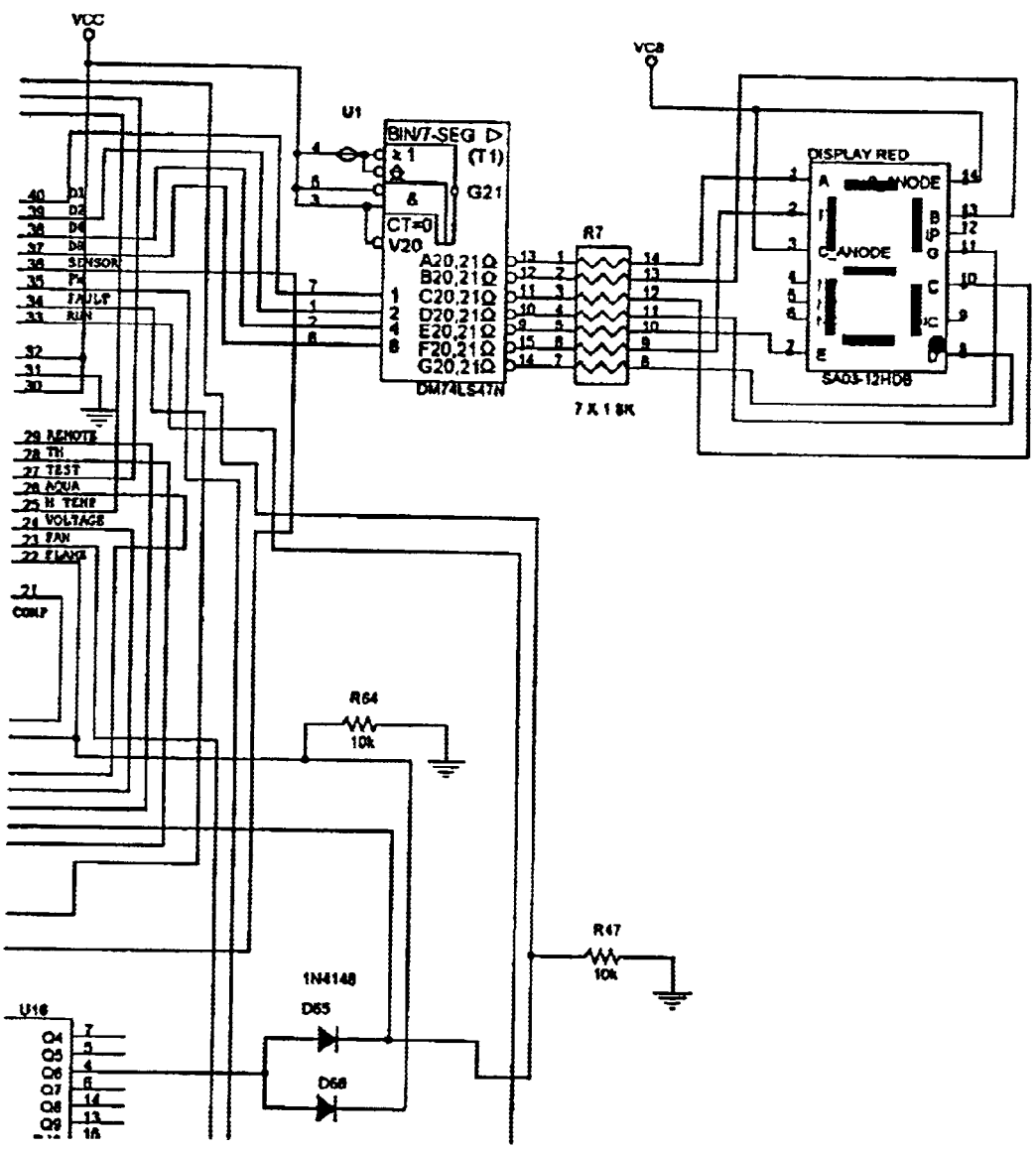
FIG. 5 (3/9) SHT.

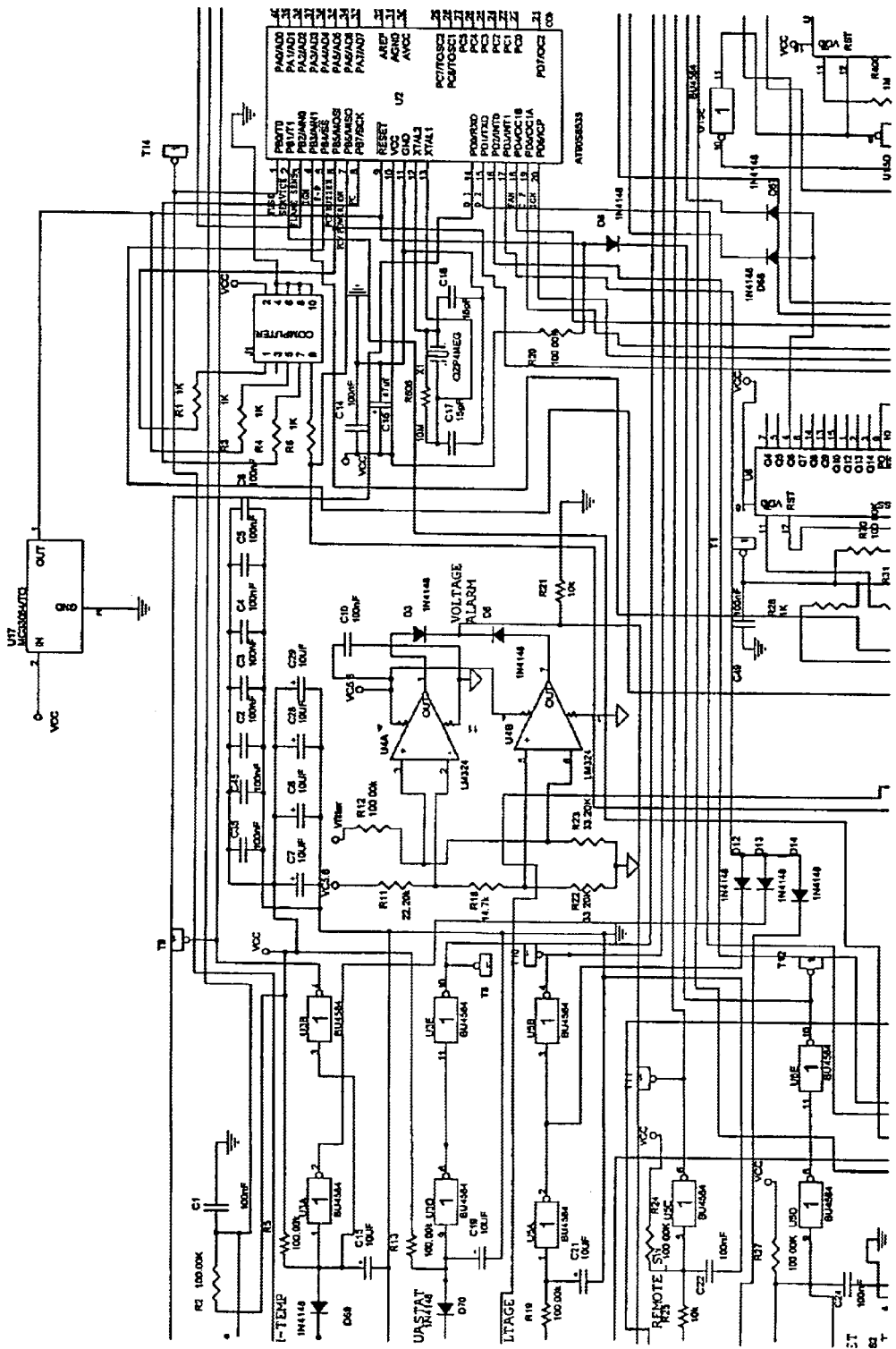
FIG. 5 SHT. (4/9)

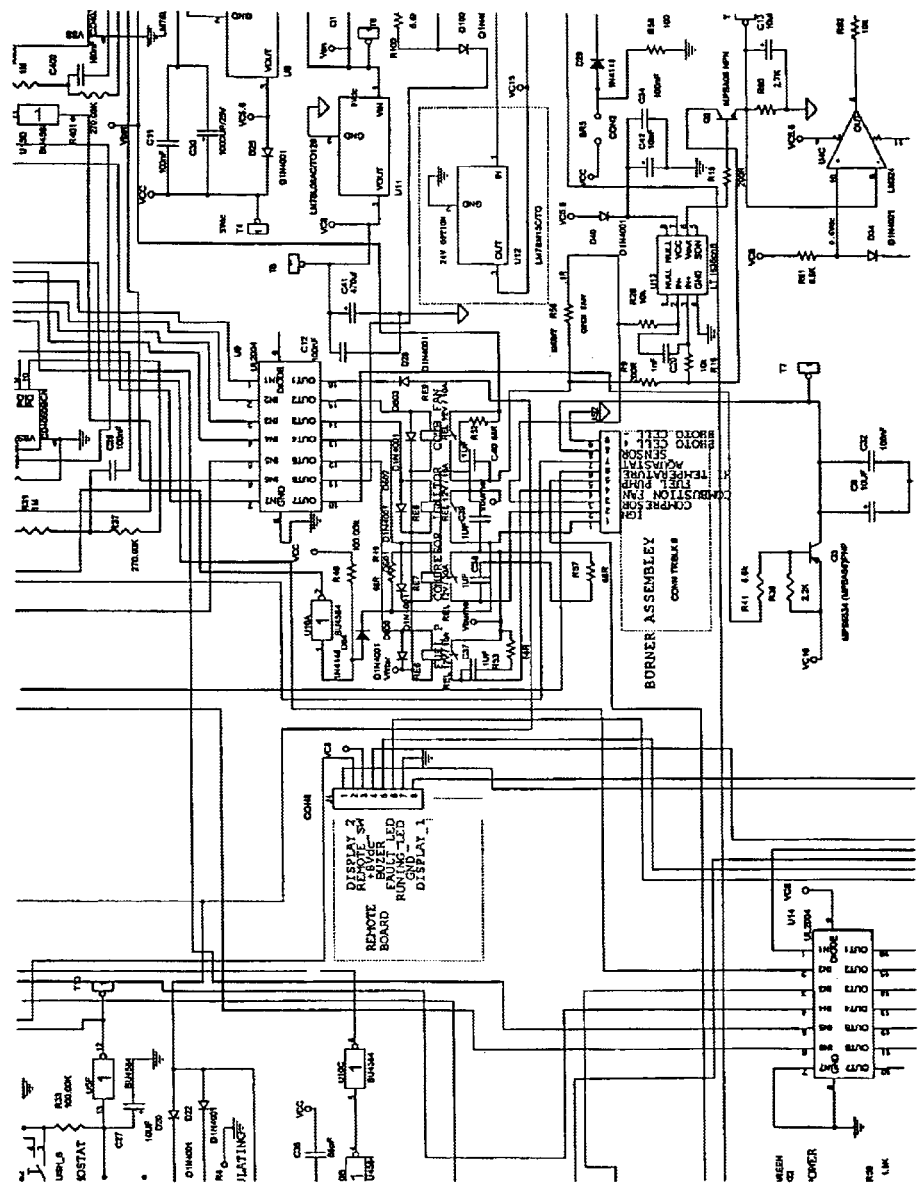
FIG. 5 SHT. (5/9)

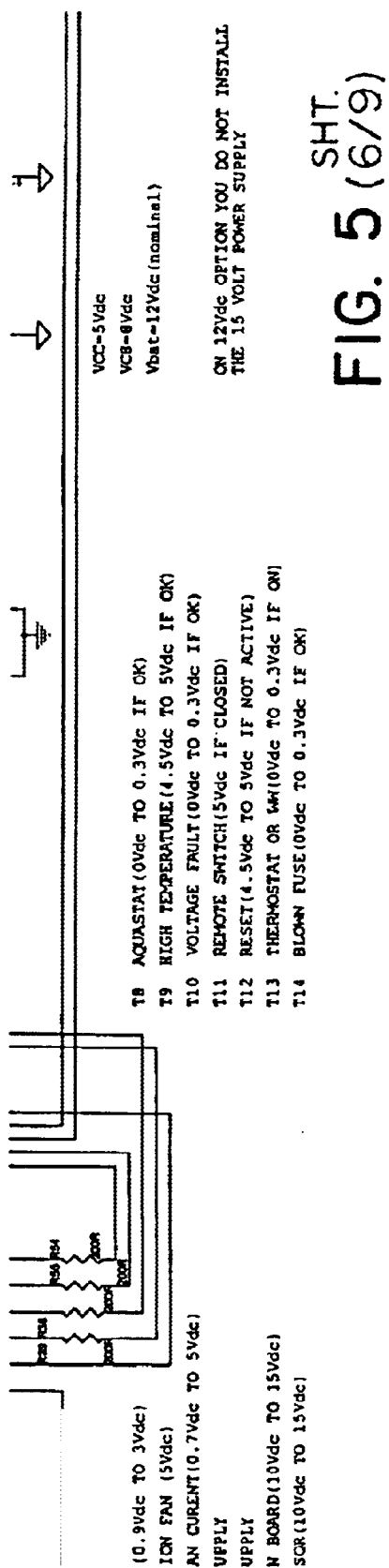
FIG. 5 (6/9) SHT.
FIG. 5 (7/9) SHT.

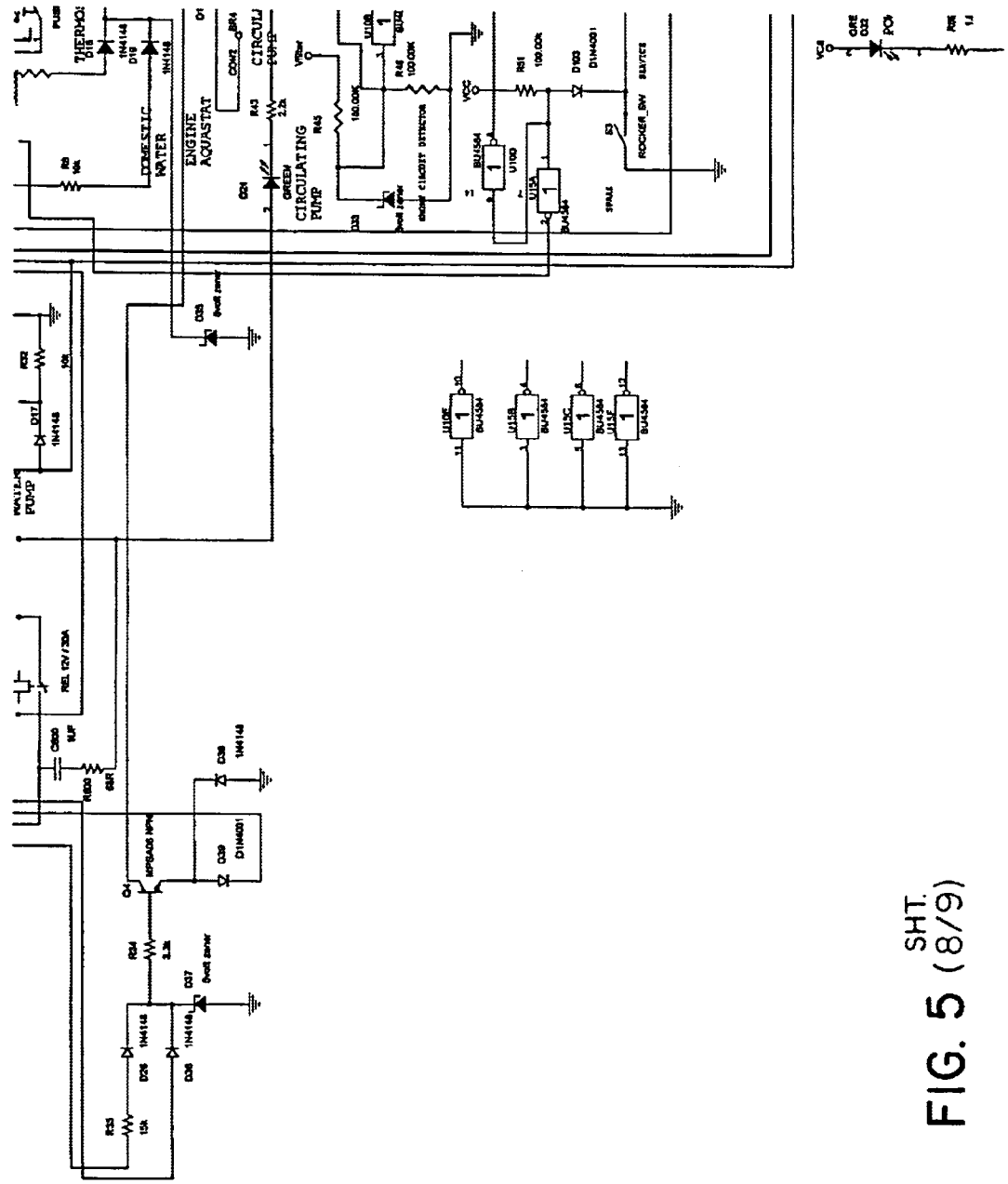
FIG. 5 SHT. (8/9)

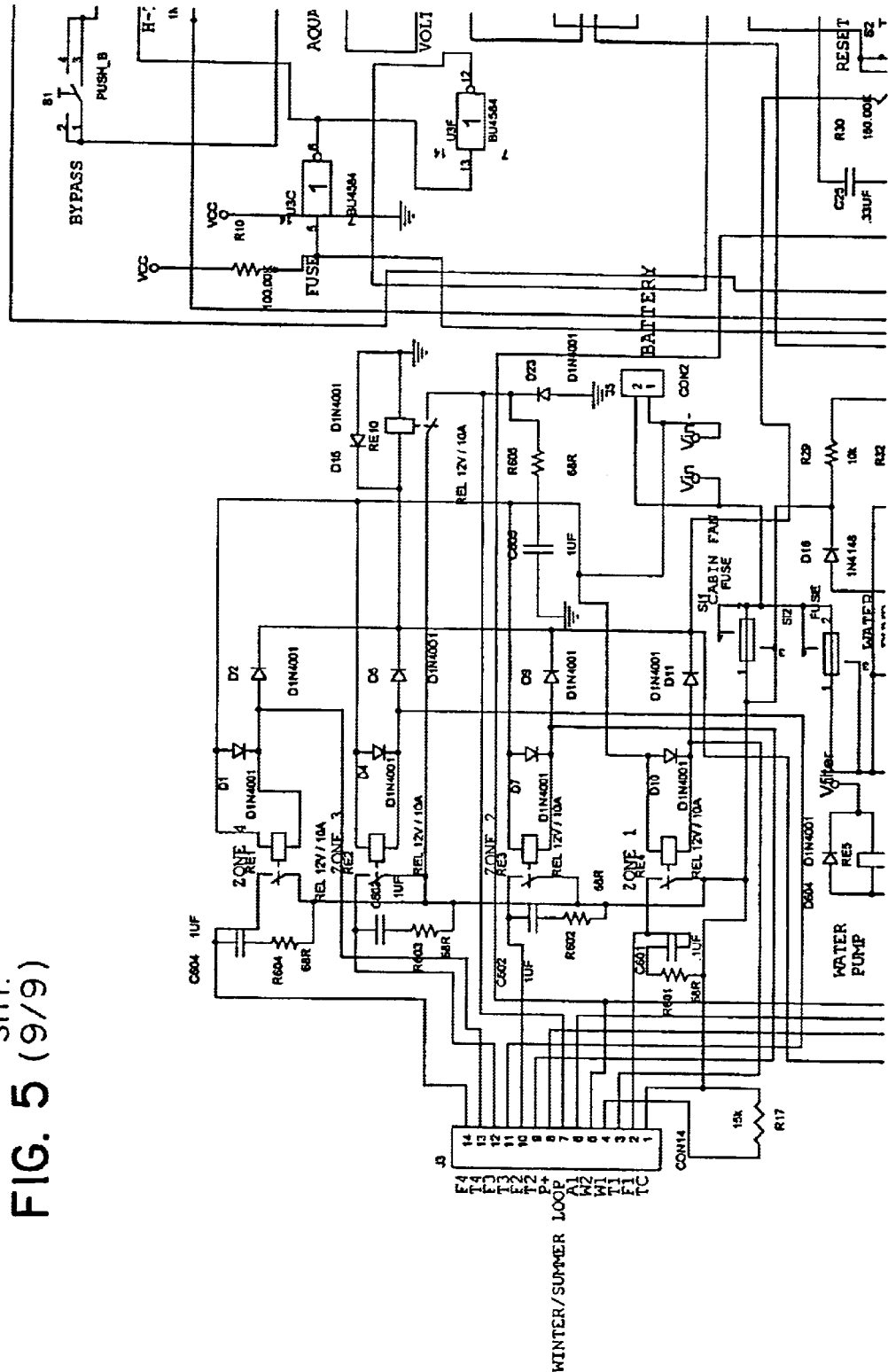
FIG. 5 SHT. (9/9)

DIAGNOSTIC CODES

```
0  VOLTAGE LOW OR HIGH
1  OVERHEAT
2  FUSE BLOWN
3  FUEL PUMP/SOLENOID
4  IGNITOR
5  COMBUSTION FAN
6  WATER PUMP
7  FLAME OUT
8  COMPRESSOR
C  HEATER CYCLING
t  THERMOSTATS OFF
E  REMOTE SWITCH OFF
U  SERVICE SWITCH OFF
⊐  BYPASS MODE
```

FIG. 7

Diagnostic code interpretation displayed on the remote panel with LCD

CODE  DISPLAY ON REMOTE PANEL WITH LCD

BLANK — HEATER RUNNING
EVERYTHING OK (THANK YOU FOR CHOOSING XXXXX) —171

0 — VOLTAGE FAULT
CHECK VOLTAGE

FOR SERVICE CALL
1-800-XXX-XXXX

1 — HIGH TEMPERATURE
CHECK COOLANT (FOR SERVICE CALL
1-800-XXX-XXXX) —170

2 — BLOWN FUSE
CHECK FUSES

FOR SERVICE CALL
1-800-XXX-XXXX

3 — FUEL PUMP OR
SOLENOID SHORTED

— FOR SERVICE CALL
1-800-XXX-XXXX

4 — IGNITOR
SHORTED OR OPEN

FOR SERVICE CALL
1-800-XXX-XXXX

5 — COMBUSTION FAN
SHORTEN OR OPEN

FOR SERVICE CALL
1-800-XXX-XXXX

6 — CIRCULATING PUMP
SHORTED

FOR SERVICE CALL
1-800-XXX-XXXX

7 — FLAME OUT
SEE SERVICE BOOK

FOR SERVICE CALL
1-800-XXX-XXXX

8 — COMPRESSOR
SHORTED TO BAD

FOR SERVICE CALL
1-800-XXX-XXXX

⌐ — REMOTE SW. OFF
HEATER STOPPED

⌐ — AQUASTAT OFF
HEATER CYCLING

⌐ — THERMOSTAT OFF
HEATER STOPPED

⊔ — SERVICE SW. OFF
POWER DOWN IN 2M

THANK YOU FOR
CHOOSING XXXXXXX

FAULTS COUNTER
0=XXXX 1=XXXX

2=XXXX 3=XXXX
4=XXXX 5=XXXX

6=XXXX 7=XXXX
8=XXXX

⊐ — BYPASS MODE
FOR 5 MINUTES

THE HEATER WILL
RUN UNSUPERVISED

FIG. 8

POTABLE WATER HEATER AND METHOD OF USING SAME

This invention relates to a heater and, more particularly, to a heater finding particular application in recreational vehicles, boats and the like where heated potable water is required and where heating for the vehicle or boat is required from time to time.

BACKGROUND OF THE INVENTION

In our pending U.S. application Ser. No. 08/851,465 filed May 5, 1997, the contents of which are incorporated herein by reference, there is disclosed a fuel powered heater used for heating fluid which fluid is subsequently used for circulation throughout a heating system and which finds particular application in boats and recreational vehicles. While the heated fluid is used to warm the environment in the vehicle or boat wherein the heater is placed, it is often the case that heated potable water is also useful for cooking, drinking, washing and the like within the recreational vehicle or boat. Heretofore, such heated potable water has generally been produced by a heater independent from the heating system used for heating the vehicle or boat and the fuel used in such independent heaters is usually propane.

It is also often desired that the fuel powered heater used for heating fluid be supplemented or replaced by an AC powered heater if there is a source of AC power available. This might be the case where the boat is docketed and AC power is available or where the recreational vehicle is in an RV park where AC power is available.

WO 99/61884 (Rixen), published Dec. 2, 1999 and entitled HEATING SYSTEM FOR POTABLE WATER AND RELATIVELY SMALL AREAS, teaches a heating system used to heat a recreational vehicle which system is also used to heat potable water. This system is an advance in an attempt to achieve potable water and space heating with an integrated system. However, Rixen teaches a supplemental heater and a heat exchanger, which supplemental heater heats a second liquid independent from the heating of the first fluid. The use of two powered heaters to heat two fluids, one for each fluid, is costly and creates additional servicing and maintenance problems. Further, Rixen's apparatus is not operated automatically. He requires manual operation of the components of his heating system which manual operation is often very inconvenient.

SUMMARY OF THE INVENTION

According to one aspect of the invention, there is provided a heating system for a boat or vehicle living environment comprising a first source of heat for a first fluid and a second source of heat for said first fluid, at least one apace heater within which said first fluid circulates to provide heat to said living environment, a valve to allow said first fluid to bypass said at least one space heater or to allow said first fluid to flow through said at least one space heater, said valve being controlled by a thermostat to allow said first fluid to circulate through said space heater when said thermostat indicates heat is needed in said living environment and to bypass said space heater when said thermostat indicates heat is not required by said living environment.

According to a further aspect of the invention, there is provided a heating system for a vehicle or boat comprising a heater fluid loop with heater fluid therein, an engine circuit with engine fluid therein, a space heating loop used for heating a living environment and being operable to allow said heater fluid to circulate therein, a first heat source to heat said engine fluid, a second heat source to heat said heater fluid, a valve to route said heater fluid through said space heating loop or to bypass said space heating loop, said valve being operably connected to a thermostat for measuring the temperature of said living environment to be heated and for instructing said valve to route said heater fluid through said space heating loop or to bypass said space heating loop.

According to yet a further aspect of the invention, there is provided a heating system for heating an environment within a boat or vehicle, said heating system comprising a first heater, a first fluid circulating through said first heater and a potable water heat exchanger, a second fluid circulating through said potable water heat exchanger and being heated by said first fluid in said potable water heat exchanger, the temperature or said potable water being controlled by a thermal sensor to sense the temperature of said potable water passing through said potable water heat exchanger, said second fluid being potable water.

According to still yet a further aspect of the invention, there is provided a heating system for heating an environment within a boat or vehicle, said heating system comprising a fuel powered heater, a heater fluid line carrying fluid circulating through said fuel powered heater, a pump to circulate heater fluid through said heater fluid line, said heater fluid in said heater fluid line being heated by said fuel powered heater, said heater fluid line extending though at least one space heater in a living environment, said heater fluid in said space heater providing heat to said living environment and a temperature sensor to sense the temperature of said living environment and to control the ingress of said heater fluid into said space heater or to bypass said apace heater according to said temperature sensed by said temperature sensor and a potable water heat exchanger having an aquastat and a potable water line carrying potable water associated therewith, said heater fluid line extending through said potable water heat exchanger and exchanging heat with said potable water in said potable water line, said aquastat controlling the operation of said fuel powered heater.

BRIEF DESCRIPTION OF THE SEVERAL VIEWS OF THE DRAWINGS

Specific embodiments of the invention will now be described, by way of example only, with the use of drawings in which:

FIG. 5, appearing on seven (7) pages with nine (9) accompanying sheets, is an electronic diagram showing in greater detail the control board of FIG. 3 accompanied by sheets 1–9 which are enlarged portions of FIG. 5 and which collectively are identical of FIG. 5;

FIG. 7 sets out the diagnostic codes for the heating system displayed by the main control board according to the invention; and FIG. 8 illustrates the diagnostic code interpretations as displayed on the LCD associated with the remote control panel.

DESCRIPTION OF SPECIFIC EMBODIMENT

Figure 1:
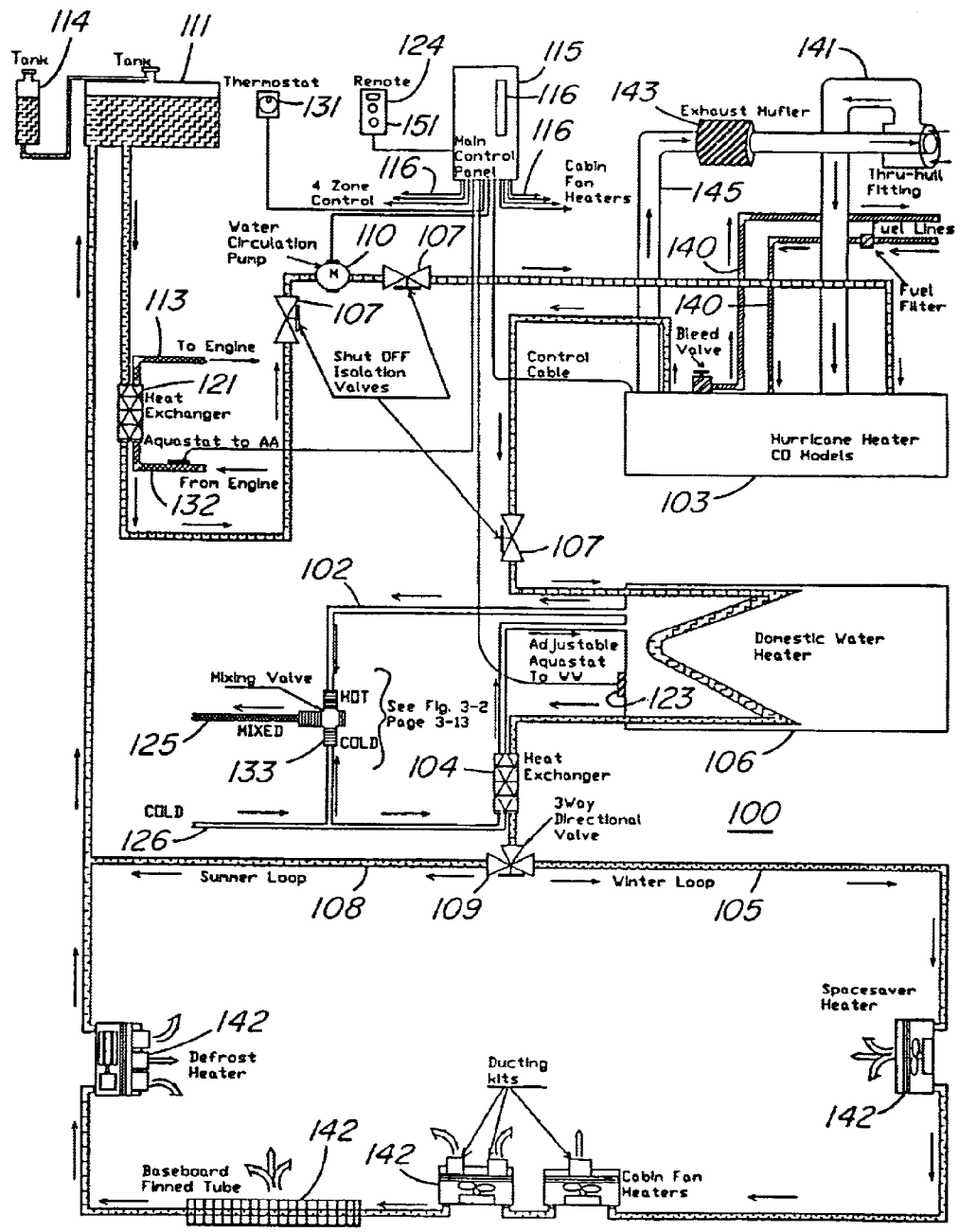
FIG. 1 is a diagrammatic overall view of the fluid and potable water heating system according to a first aspect of the invention in which an optional potable water tank is used for holding heated potable water.
Figure 2:
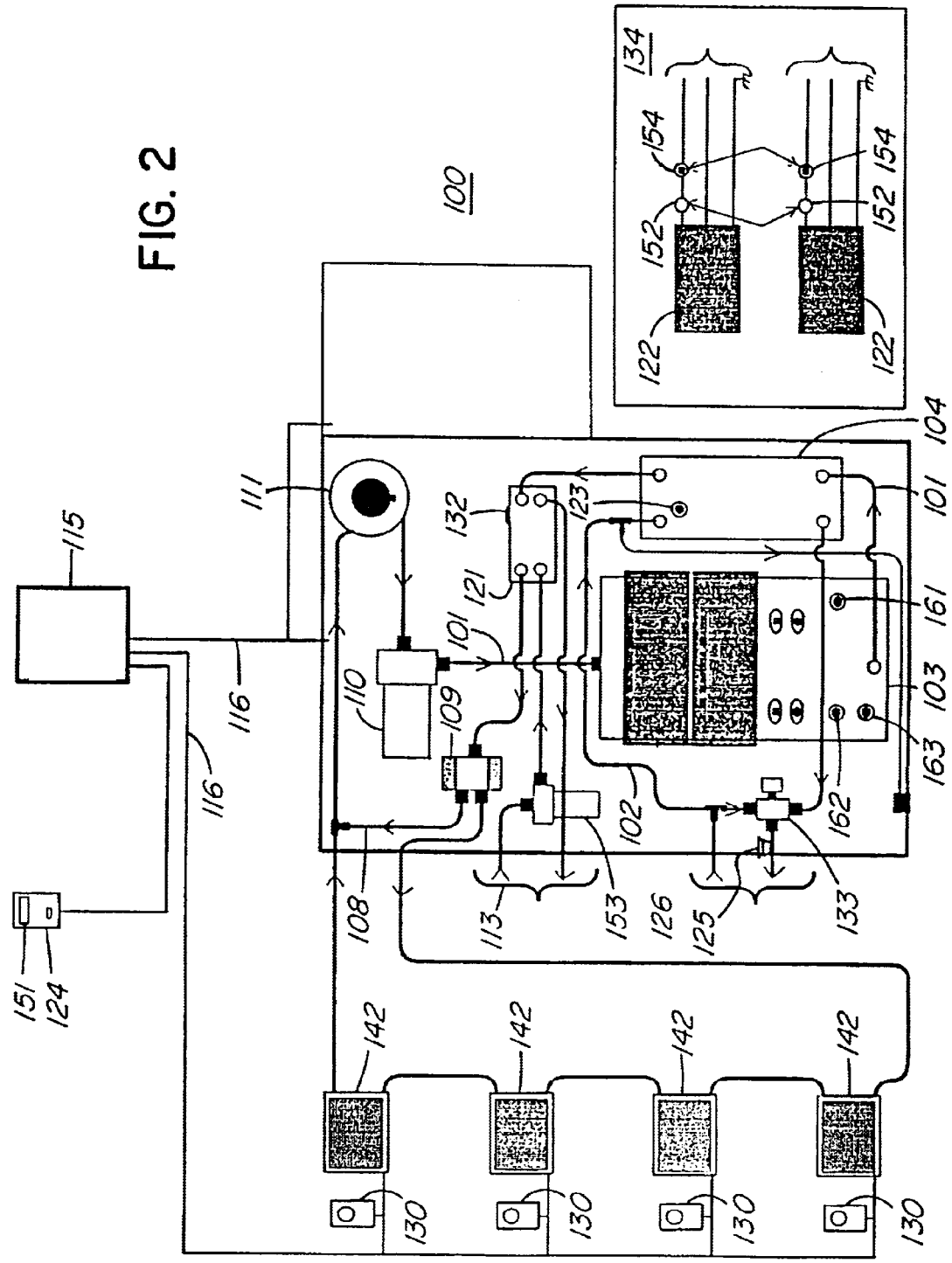
FIG. 2 is a diagrammatic overall view of the heating system similar to that of FIG. 1 but illustrating electrical apparatus for heating fluid wherein no potable water storage tank is illustrated.

Referring now to the drawings, reference is made to FIGS. 1 and 2 wherein the overall heating system according to the invention is illustrated generally at 100. The heating system 100 conveniently utilises glycol fluid circulated through a glycol circuit 101 and potable water circulated through a potable water circuit 102, although other liquids could conveniently also be used within the glycol circuit 101. A fuel powered fluid heater 103 of the air aspirated type as disclosed in our U.S. Pat. No. 5,391,075, the contents of which are herein disclosed by reference, is conveniently used to heat the glycol in the glycol circuit 101. A heater sold under the trademark HURRICANE® and marketed by International Thermal Research Ltd. of Richmond, British Columbia, Canada has proven useful for this application. A heat exchanger 104 is conveniently used to exchange heat from the glycol fluid in the glycol circuit 101 to the potable water in the potable water circuit 102.

A potable water heater and storage tank 106 is provided to heat the potable water although it is optionally provided in the configuration of FIG. 1. A pump 110 moves the glycol through the glycol circuit 101 and isolation valves 107 are provided to terminate or allow flow of the glycol through the glycol circuit 101.

A single thermostat 131 (FIG. 1), in the event a single heating zone is heated or a plurality of thermostats 130 (FIG. 2) in the event a plurality of heating zones are heated, monitor the temperature of the living space or environment of the vehicle or boat. Aquastats 123, 132, adjustable as desired, are provided to monitor the temperatures within the potable water heater 106 and the engine fluid circuit 113, respectively, and to send appropriate temperature information to the main control board 115. An engine pump 153 (FIG. 2) circulates water in the engine circuit 113 as will be described. Cycling aquastats 152 (FIG. 2), an additional one being used as a failsafe backup aquastat, used with the AC powered wire coils 122, are positioned within the annulus of the fluid heater 103 and are operable to maintain the potable water at approximately 150 deg. F., the aquastats 152 having a range of about 10 deg. F. A pair of high temperature aquastats 154 shut down the power supplied to the AC powered coils 122 if the temperature of the fluid exceeds 200 deg. F. for safety purposes.

The glycol circuit 101 includes a winter loop circuit 105 to heat the space or zones within which the various space heaters 142 are located and a summer loop circuit 108 which bypasses the winter loop circuit 105 according to the position of three way directional valve 109 which valve 109 is manually or conveniently automatically operated by, for example, adjustable thermostat 131 or thermostats 130 (FIG. 2) which measure the environment or living space temperature. If the temperature of the space is below that desired by the user, three way valve 109 will allow the heated glycol to circulate through the winter loop 105. If the temperature is above the desired user temperature as measured by thermostat 131, three way valve 109 will bypass the winter loop 105 and pass the glycol directly to summer loop 108 thereby avoiding a temperature increase in the living environment of the vehicle or boat. Further, by bypassing the winter loop 105 when the heat for space heating is not required, the heat provided to the potable water through heat exchanger 104 will be more efficiently used and the temperature increase of the potable water will be more quickly achieved such as would be desirable, for example, if hot water was suddenly needed.

An expansion tank 111 and an overflow tank 114 are associated with the glycol circuit 101. A heat exchanger 121 is provided between the glycol circuit 101 and the engine fluid circuit 113 to allow heat to be exchanged between the two circuits 101, 113 in the event the engine is operating such that the fluid heater 103 is not required. A mixing valve 133 is provided in the potable water circuit 102 to allow for the desired water temperature in circuit 125 due to mixing the cold water provided by the inlet circuit 126 prior to heating the potable water in heat exchanger 104 or potable water heater 106 and the heated water emanating from the heat exchanger 104 or potable water heater 106.

A main control panel 115 (seen in more detail in FIG. 5) is used to control the various components of the overall water heating system 100 and is further used to interrogate the components so as to display any problem or fault associated with the various components. A remote control 124 with an associated LCD display 151 may be operably associated with the main control panel 115 and mounted for operation at a location more user convenient than that occupied by the main control panel 124. A wiring harness 116 (see also FIG. 2) runs from the main control panel 115 to the space heaters 142 in winter loop 105 and associated space heater thermostats 130, it being appreciated that the individual ones of the space heaters 142 may be located in different living areas and each may conveniently have an individual bypass loop as well as the entire circuit 105 being bypassed by directional valve 109 which will allow the heater water in the winter loop 105 to enter or to bypass the respective space heaters 142 according to the user desired temperatures as evidenced by thermostats 130.

The usual components are associated with the fuel powered fluid heater 103. Fuel lines 140 are used to provide fuel to and allow fuel to leave heater 103. An air intake duct 141 supplies combustion air to the fluid heater 103 and an exhaust duct 145 allows for exhaust to the ambient surroundings through a muffler 143.

The LCD display 151 provided on the remote control 124 displays text and number relating to the operating conditions and heater system diagnostics as will be described. The display format is user friendly in a text and numerical form and may include servicing information and advertising.

Referring now to FIG. 2, in which like numerals cover the same apparatuses as shown in FIG. 1 but which embodiment does not utilise a separate potable water heater 106 as illustrated in FIG. 1, a first technique for heating glycol fluid passing through the fluid heater 103 where it is not desired to utilise the fluid fuel powered heater 103 such as when an AC power source is available, is to use a set of wire coils 122 which coils 122 are easily attached to and removed from the circumference of the fluid heater 103 and which are heated by passing AC power through the coils 122 when desired. This is one of several techniques which may be used to heat the water in the fluid heater 103 when AC power is available, another being to simply provide an immersible rod (not shown) into the glycol circuit 101 which rod heats the fluid upon passing power through the rod. These techniques and others using AC power as an independent heat source to heat the fluid in the fluid circuit 101 are commonly used and form no part of the present invention.

Figure 3:
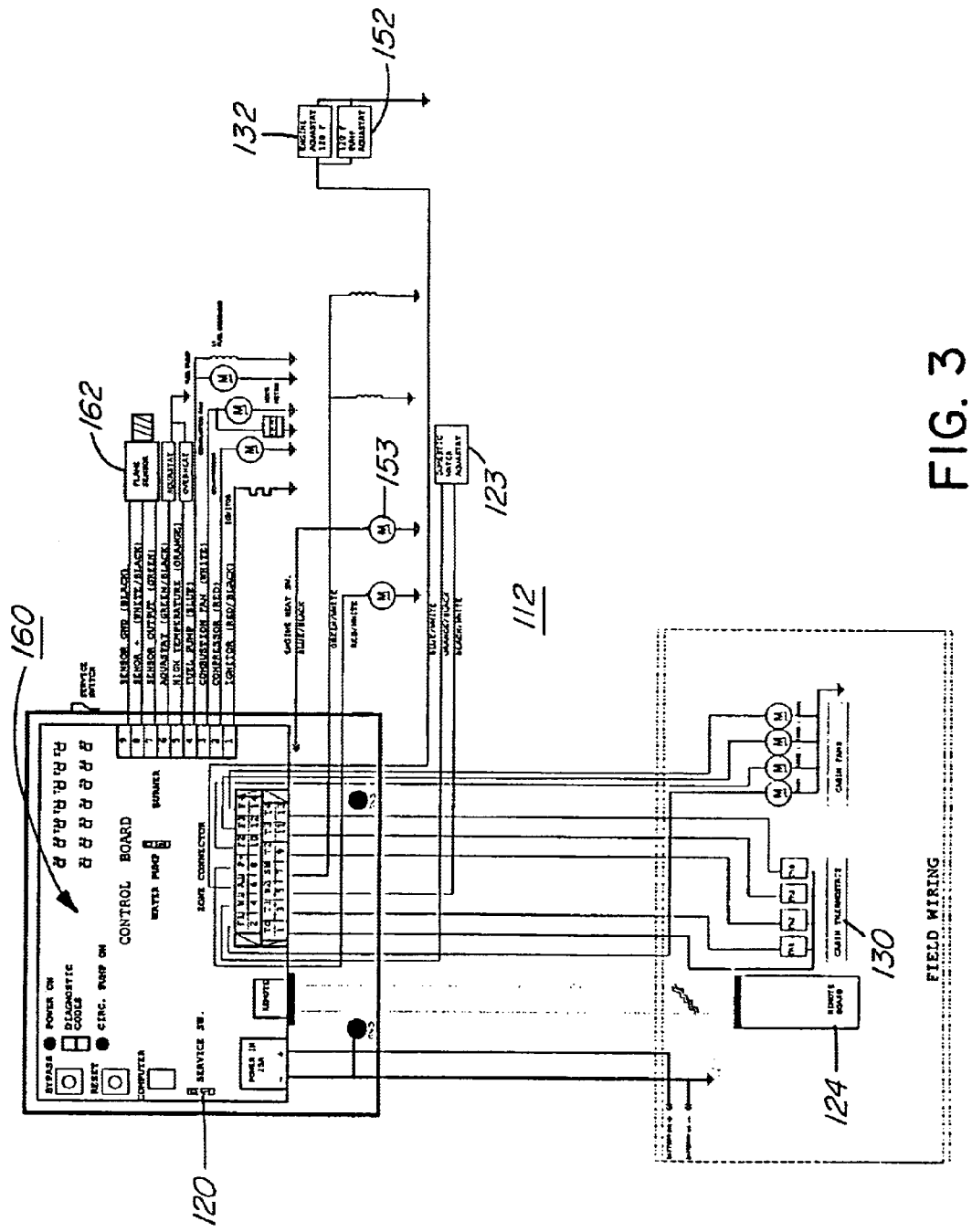
FIG. 3 illustrates a wiring diagram for the systems illustrated in FIGS. 1 and 2.
Figure 4:
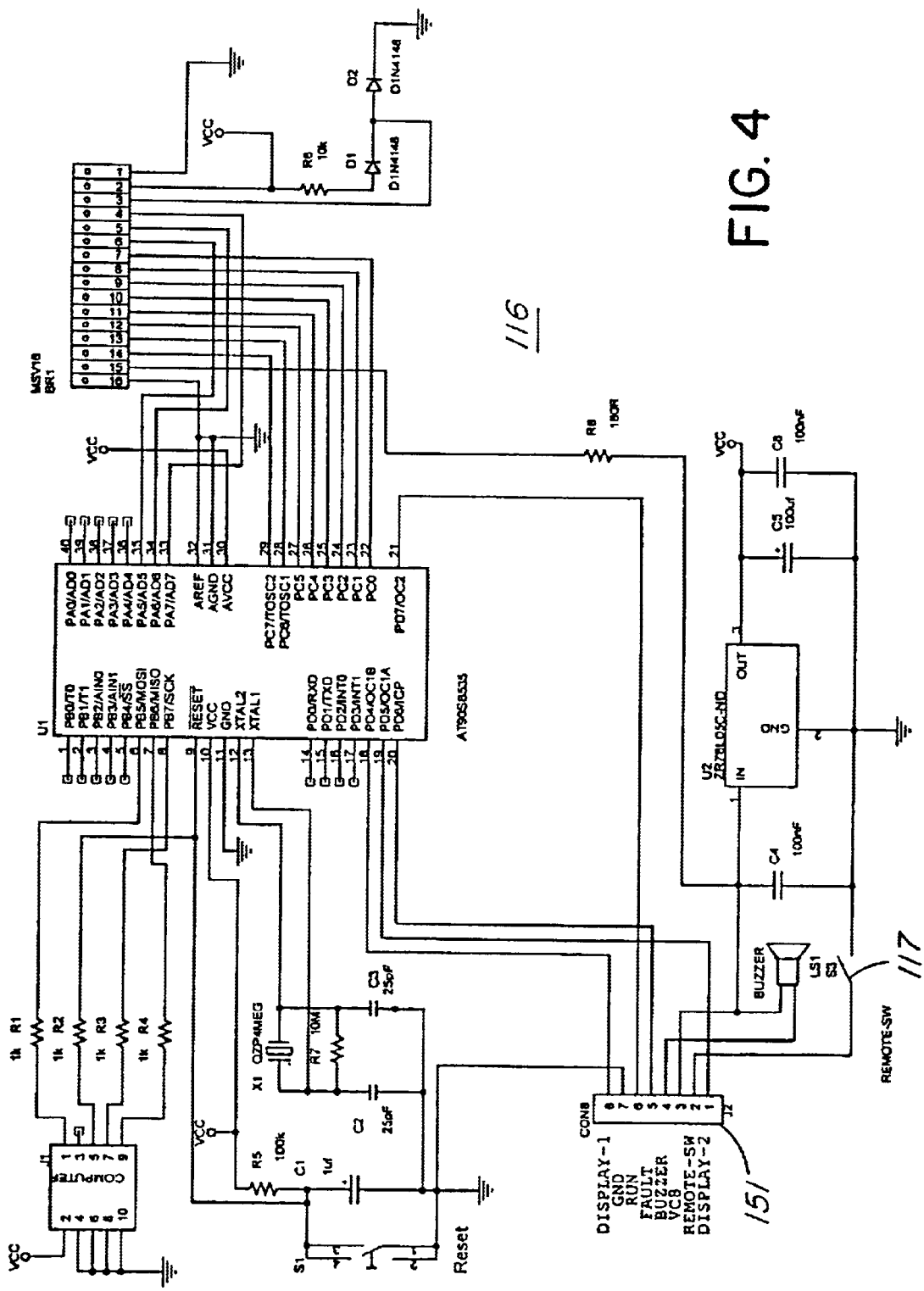
FIG. 4 is a schematic illustrating the diagnostics for the systems illustrated in FIGS. 1 and 2.

A diagnostic system used for the system diagnostics is generally illustrated at 116 in FIG. 4. The result of the diagnostics is displayed by LCD display 151 which diagnostic display 151 will be described in greater detail. The diagnostic codes for the heater 103 are illustrated in FIG. 7. These diagnostic codes are displayed on the main control board 115 by numeric display 160 (FIGS. 1 and 5). The numeric display 160 is converted to the textual and numerical display of FIG. 8 on LCD 151 by a micro-controller associated with the remote control 124. The wiring diagram used for the systems of FIGS. 1 and 2 is shown generally at 112 in FIG. 3. A service switch 120 provides power to the main control board 115. A remote switch 117 (FIG. 4) allows the user to remotely control the operation of the fluid heater 103.

Figure 6:
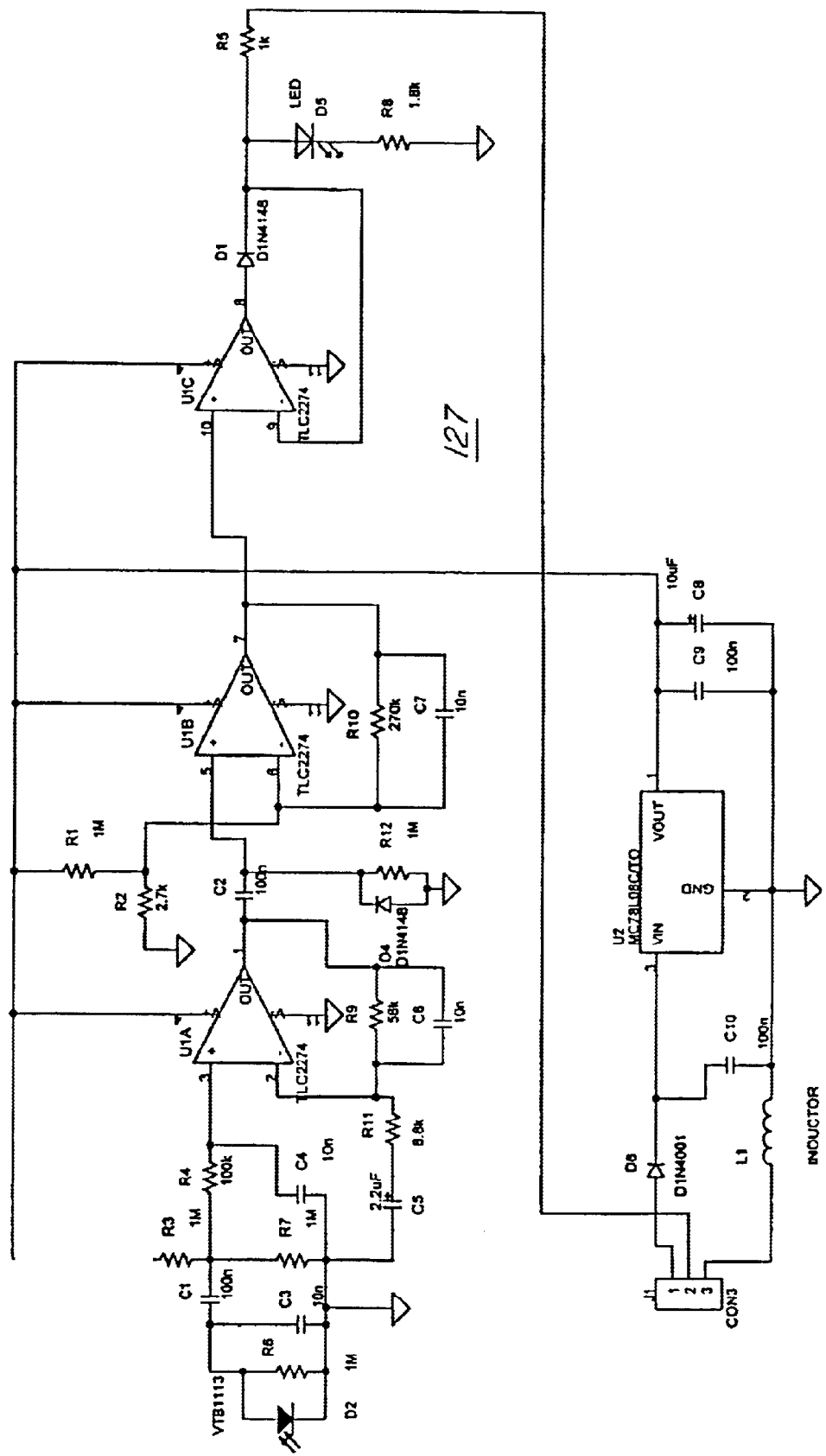
FIG. 6 illustrates the circuit for the flame sensor of FIG. 3.

The flame sensor circuit is generally illustrated at 127 in FIG. 6 and is used for sensing the presence or absence of a flame in the fluid heater 103. The flame sensor circuit 162 is illustrated and described in detail in our pending U.S. patent application Ser. No. 09/579,444 filed May 26, 2000, the contents of which are herein disclosed by reference.

OPERATION

In operation, it will be assumed that the vehicle or boat is at rest with the engine not running and that AC shore or outside power is available to the vehicle or boat from an AC power source generally illustrated at 134 (FIG. 2). The AC power source 134 is intended to heat and to maintain the potable water within the temperature range of 150 deg. F. and 205 deg. F. as defined by cycling aquastats 152 and high temperature or limit aquastats 154 (FIG. 2). In the event the temperature of the fluid measured by the aquastats 152 falls below 150 deg. F., the wire coils 122 will commence operation and draw AC power from the AC power source 134.

The AC heater coils 122 (FIG. 2) form an independent heat source for the fluid in the glycol circuit 101. The cycling aquastats 152 are normally closed when the temperature is below 150 deg. F. and allow the flow of AC power. The aquastats 152 open when the temperature of the fluid exceeds 150 deg. F. thereby shutting down the power. There is an approximate 10 deg. Temperature range of the cycling aquastats 152. High temperature or safety limit aquastats 154 terminate AC power flow to the coils 122.

If the aquastats 152 are closed indicating that heat is required in the glycol circuit and power is flowing in the AC circuit, aquastats 161, 132 become relevant. If either of aquastats 161 or 132 are closed thereby to indicate that heat is available, fluid pump 110 will be activated and the glycol will circulate through the fluid heater 103 and potable water heat exchanger 104 without the operation of fluid heater 103 being necessary. If aquastat 161 opens thereby indicating the temperature has dropped below 100 deg. F., it is apparent the heat created by the coils 122 is insufficient. Accordingly, the pump 110 will terminate and the fuel heater 103 will commence operation assuming main and remote switches 120, 117, respectively, are in the "ON" position. When the temperature of the glycol exceeds 100 deg. F., as measured by aquastat 161, the pump 110 will again commence operation.

While the fuel powered heater 103 is operating, cycling aquastats 162 will attempt to maintain a fluid temperature of 180 deg. F. High temperature aquastats 163 will terminate operation of the heater 103 when the temperature exceeds 180 deg. F. for safety reasons. When aquastats 152 exceed 150 deg. F., the AC powered coils 122 will terminate operation but fuel powered heater 103 will continue operation until aquastat 162 reaches 180 deg. F. at which point the fuel powered heater 103 will terminate operation with the pump 110 continuing to operate until aquastat 161 drops below 100 deg. F. or until there is no demand for heat as represented by aquastat 123 in potable water heat exchanger 104 or as represented by thermostats 130. If desired, the operation of the fuel powered heater 103 may be terminated by moving remote switch 117 to the OFF position.

The heat provided from the engine forms a third independent source of heat for the heating system 100 in the event the engine is operating. In this case, aquastat 132 will be sensing the temperature in heat exchanger 121. If heat is required as indicated by thermostats 130 or by aquastat 123 on potable water heat exchanger 104, then pump 110 will commence operation when aquastats 132 or 161 indicate heat is available from either the engine or the fuel powered heater 104, and the glycol in glycol circuit 101 will be heated in the engine heat exchanger 121 and provide the requested heat to any or all of the space heaters 142 and potable water heat exchanger 104. When the thermostats 130 indicate no heat is required in the winter loop 105, three way directional valve 109 will terminate flow through the winter loop 105 and the heated glycol will flow only through the potable water heat exchanger 104. When aquastat 123 indicates the potable water is at 150 deg. F. or above, the pump 110 will terminate operation.

It will next be assumed that it is desired to heat the space within which the various space heaters 142 are situated. The user will raise the temperature of thermostat 131 (FIG. 1) or one of thermostats 130 (FIG. 2) to the desired temperature of the space to be heated. This will initiate operation of the three-way directional valve 109 and require heated glycol in the glycol circuit 101 to be circulated through the winter loop circuit 105 as is shown in FIGS. 1 and 2. The circulation of glycol through the winter loop 105 will continue until the temperature sensed by thermostat 151 or one of the thermostats 130 reaches the desired user value at which point the three-way directional valve 109 will terminate flow through the winter loop 105 and initiate glycol flow only through the summer loop 108 thereby avoiding any additional heat emanating from the heaters 142 in the winter loop 105 and providing heat solely to heat the potable water through heat exchanger 104 which is a more efficient use of the heated glycol in the glycol circuit 101.

It will now be assumed that the vehicle or boat is underway and that the engine is operating in its normal operating mode. No shore based AC power is available and therefore the wire coils 122 will not be operating. Aquastat 132, which is associated with heat exchanger 121, will be monitoring the temperature of the fluid in the engine circuit 113. In the event aquastat 132 senses a temperature of greater than 120 deg. F., it will signal the control board 115 that heat is available from the engine circuit 113. If the aquastat 123 associated with heat exchanger 104 indicates water temperature below 150 deg. F., pump 110 will commence operation and circulate the glycol within the glycol circuit 101 thereby picking up heat from the engine fluid by way of heat exchanger 121 until the potable water temperature returns to a temperature of greater than 150 deg. F. at which point pump 110 will cease operation. Ordinarily, engine operation will suffice to maintain the potable water temperature above 150 deg. F.

In the event there is no engine power and no source of AC power, the heat to supply the space heaters 142 and to provide heated potable water is provided by the fluid heater 103. The aquastat 132 will indicate no heat is available from the engine circuit 113 and, accordingly, when the aquastat 123 indicates a temperature of less than 150 deg. F., the fluid heater 103 will commence operation and the pump 110 will circulate the glycol within glycol circuit 101.

If the service switch 120 is ON, control board 115 is continuously supervising the system 100 and sending coded electric signals to the remote panel 124 where the LCD 151 is located. A micro-controller on remote panel 124 will interpret the codes and convert the codes to a user friendly display in a text and numerical format. In addition, the micro-controller will store the information concerning faults associated with the components of the system and display the loggings of such faults when the system is initially powered up and while the system 100 is on a purge mode when the system 100 is turned off from its operating mode by service switch 120.

FIG. 7 illustrates the diagnostic codes which are displayed on main control board display 160 (FIGS. 3 and 5). Each number or symbol represents a particular diagnostic condition and, to allow a display from LCD 151 in a user friendly format, the codes are converted by a micro-controller on the remote control 124 according to the interpretations of FIG. 8. In addition to the user friendly text and number display, a service number may be given as at 170 (FIG. 8) or advertising may be displayed as shown at 171.

Any known display technique may be used besides that of an LCD, such as light emitting diodes, fluorescent displays and the like.

Various other modifications and changes may readily occur to those skilled in the art to which the invention relates and the specific embodiments described should be taken as illustrative of the invention only and not as limiting its scope as defined in accordance with the accompanying claims.

We claim:

1. Heating system for a boat or vehicle living environment comprising a first source of heat for a first fluid and a second source of heat for said first fluid, at least one space heater within which maid first fluid circulates to provide heat to said living environment, a valve to allow said first fluid to bypass said at least one space heater or to allow said first fluid to flow through said at least one space heater, said valve being controlled by a thermostat to allow said first fluid to circulate, through said space heater when said thermostat indicates heat is needed in said living environment and to bypass said space heater when said thermostat indicates heat is not required by said living environment.

2. Heating system as in claim 1 wherein said thermostat is adjustable.

3. Heating system as in claim 1 wherein said first source of heat is a fuel powered heater and said second source of heat is an AC powered heater.

4. Heating system as in claim 3 and further comprising a potable water circuit for carrying potable water and a first heat exchanger between said first fluid and said potable water, maid first heat exchanger exchanging heat from said first fluid to said potable water.

5. Heating system as in claim 1 and further comprising a third source of heat for said first fluid.

6. Heating system as in claim 4 wherein said third source of heat is an engine of said boat or vehicle.

7. Heating system as in claim 5 wherein said third source of heat heats a second fluid and further comprising a second heat exchanger between said second fluid and said first fluid to exchange heat between said second fluid and said first fluid.

8. Heating system as in claim 4 and further comprising a first fluid pump to pump said first fluid through maid first heat exchanger carrying said first fluid and said potable water.

9. Heating system for a vehicle or boat comprising a heater fluid loop with heater fluid therein, an engine circuit with engine fluid therein, a space heating loop used for heating a living environment and being operable to allow said heater fluid to circulate therein, a first heat source to heat said engine fluid, a second heat source to heat said heater fluid, a valve to route maid heater fluid through said space heating leap or to bypass said space heating loop, said valve being operably connected to a thermostat for measuring the temperature of said living environment to be heated and for instructing said valve to route said heater fluid through said space heating loop or to bypass said space heating loop.

10. Heating system as in claim 9 wherein said thermostat is adjustable.

11. Heating system as in claim 9 wherein said first heat source is an engine of said vehicle or boat.

12. Heating system as in claim 11 wherein said second heat source is a fuel powered heater.

13. Heating system as in claim 9 and further comprising a third heat source to heat said heater fluid.

14. Heating system as in claim 13 wherein said third source of heat is an AC powered heater.

15. A heating system for heating an environment within a boat or vehicle, said heating system comprising a first heater, a first fluid circulating through said first heater and a potable water heat exchanger, a second fluid being potable water circulating through said potable water heat exchanger and being heated by said first fluid in said potable water heat exchanger, the temperature of said potable water being controlled by a thermal sensor which directly senses the temperature of said potable water passing through maid potable water heat exchanger.

16. Heating system as in claim 15 and further comprising a second heater.

17. Heating system as in claim 16 wherein said second heater heats said first fluid.

18. Heating system as in claim 17 wherein said first heater is a fuel powered heater and said second heat source is an AC powered heater.

19. A heating system for heating an environment within a boat or vehicle, said heating system comprising a fuel powered heater, a heater fluid line carrying fluid circulating through said fuel powered heater, a pump to circulate heater fluid through said heater fluid line, said heater fluid in said heater fluid line being heated by said fuel powered heater, said heater fluid line extending though at least one space heater in a living environment, said heater fluid in said space heater providing heat to said living environment and a temperature sensor to sense the temperature of said living environment and to control the ingress of said heater fluid into said space heater or to bypass said space heater according to said temperature sensed by said temperature sensor and a potable water heat exchanger having an aquastat directly sensing the temperature of potable water, and a potable water line carrying potable water associated with said potable water heat exchanger, said beater fluid line extending through said potable water heat exchanger and exchanging heat with said potable water in said potable water line, said aquastat controlling the operation of said fuel powered heater.

20. Heating system as in claim 19 and further comprising an AC powered heater to heat said heater fluid separately from or in combination with said fuel powered heater.

* * * * *